United States Patent [19]

Johnson et al.

[11] E Re. 29,878

[45] Reissued Jan. 9, 1979

[54] METHOD FOR MAKING REPLICA CONTOUR BLOCK MASTERS FOR PRODUCING SCHMIDT CORRECTOR PLATES

[75] Inventors: Thomas J. Johnson, Palos Verdes Estates; John F. O'Rourke, Torrance, both of Calif.

[73] Assignee: Celestron Pacific, Torrance, Calif.

[21] Appl. No.: 650,636

[22] Filed: Jan. 20, 1976 (Under 37 CFR 1.47)

Related U.S. Patent Documents

Reissue of:

[64] Patent No.: 3,837,124
Issued: Sep. 24, 1974
Appl. No.: 400,994
Filed: Sep. 26, 1973

[51] Int. Cl.[2] ..... B24B 13/00; B24B 1/00

[52] U.S. Cl. ..... 51/283 R; 51/324

[58] Field of Search ..... 51/284, 324, 235, 281 R, 51/216 LP, 283

[56] References Cited

U.S. PATENT DOCUMENTS

| | | | |
|---|---|---|---|
| 3,210,894 | 10/1965 | Bentley | 51/284 |
| 3,465,481 | 9/1969 | Szwarcman | 51/324 |
| 3,685,216 | 8/1972 | Frey | 51/324 X |
| 3,693,301 | 9/1972 | Lemaitre | 51/324 X |
| 3,794,314 | 2/1974 | Coburn | 51/284 X |

FOREIGN PATENT DOCUMENTS

| | | | |
|---|---|---|---|
| 83256 | 7/1971 | German Democratic Rep. | 51/284 |
| 963407 | 7/1964 | United Kingdom | 51/284 |

OTHER PUBLICATIONS

Sakurai et al., *APPLIED OPTICS*, "Study of the Fabrication of Aspherical Surfaces", Nov. 1963.

*Primary Examiner*—Robert C. Watson
*Attorney, Agent, or Firm*—Semmes David H.

[57] ABSTRACT

A method for making replica contour block masters for use in producing Schmidt correctors wherein a finished Schmidt corrector plate to be duplicated, which is flat on one side and figured on the other, is placed with its flat side on a flat surfaced spindle master, a thin piece of glass to constitute a replica piece is placed on the corrector plate and a vacuum drawn therebetween to conform their surfaces, the replica piece is ground and polished flat on the free surface, the corrector plate and replica piece removed from the spindle master and the replica piece placed flat side to flat surface on the spindle master in a semipermanent bond therewith and constituting together a contour block master.

17 Claims, 5 Drawing Figures

METHOD FOR MAKING REPLICA CONTOUR BLOCK MASTERS FOR PRODUCING SCHMIDT CORRECTOR PLATES

Matter enclosed in heavy brackets [ ] appears in the original patent but forms no part of this reissue specification; matter printed in italics indicates the additions made by reissue.

BACKGROUND OF THE INVENTION

PRIOR ART

New Procedure for Making Schmidt Corrector Plates, Applied Optics, Vol. 11, No. 7, July, 1972. The Vacuum Method of Making Corrector Plates, Sky and Telescope, June, 1972. Making Corrector Plates by Schmidt's Vacuum Methods, Applied Optics, May, 1966, Vol. 5, No. 5, pages 713–715. U.S. Pat. No. 3,693,301, Lemaitre. Study of the Fabrication of Aspherical Surfaces, Sakurai & Shishido, Applied Optics, November, 1963.

There are two techniques well known in the literature for figuring Schmidt corrector plates, the first of which is often referred to as a classical approach and the second approach is referred to as the vacuum deformation technique, as evidenced, in part, by the aforementioned cited art.

The first approach, the classical approach, involves using a glass blank of high optical quality and of sufficient thickness so that one side can be worked without the glass blank slightly bending or deflecting due to work temperature or pressure during the grinding and polishing phase. The Schmidt curve is ground into the surface by rotating the blank about its center and using grinding laps which favor the areas where more glass is to be removed. It is important in this process that most of the grinding and shaping work be done with the rigid glass blank being rotated about its center on or under a grinding tool that contacts the entire surface, the grinding lap also being rigid, and this tends to keep the glass plate a perfect figure of revolution which is essential. After the shape is roughed in by courser grits, the grinding lap is cleaned thoroughly and finer grits are applied. This is repeated using progressively finer grits until the plate is ready for polishing. It is during the fine grinding stage that the figure is checked optically. The corrector is set up with the balance of the optical system with which it is to be used and tested with an optical collimater. Null testing techniques and interferometer techniques are commonly known, which allow a worker to read the errors in glass to determine the zones which need to be worked down. Using this classical approach, a high degree of skill and training are required to read the errors and properly interpret them.

The second approach, the vacuum deformation technique, is attributed to Schmidt, the original inventor of the Schmidt corrector plate. This approach consists of using a thin glass blank as a cover for a vacuum-tight chamber. When the vacuum is applied, the thin glass blank bends into the shape of a catinary curve rather than a spherical shape. While in this bent configuration, the top side of the blank is ground and polished spherical. When the vacuum is released and if the processing has been successful, there purportedly would result a perfect Schmidt corrector plate. The vacuum deformation approach implies that a thin plate can be bent sufficiently accurately and will remain sufficiently stable during the grinding procedure to result in a usable Schmidt plate. For a visual telescope, the requirements on a Schmidt plate are so demanding that the residual errors must be a small fraction of a wave length of light or accuracy approaching a millionth of an inch. If an "O" ring is used as suggested in the Sky and Telescope article, small inhomogenouities in the glass will result in non-uniform bending and therefore astigmatism or non-concentricity about its center. This approach is barely acceptable for use with a camera and would hardly be adequate if the corrector were to be used in a visual Schmidt Cassegrain system for example.

If in using the vacuum deformation approach, the O-ring is dispensed with and a rigid ring used, the ring would have to be perfectly shaped and even then the smallest bit of dust or film at the interface between the glass and ring would still render the rsulting plate of poor quality.

In the Applied Optics, November, 1963 article, it was suggested that a thin glass blank be bent over a mold having the inverse to the Schmidt curve. The opposite side would be ground and polished flat while in this bent configuration. The article did not specify [as to how the glass was to be held in place or] as to the accuracy with which the mold should be made, nor how it would be determined that the glass was actually in conformation with the mold. The article further was devoid of a teaching of the material from which the mold was to be made. *The article suggested the spreading of cement into grooves within the mold as well as into the contact surfaces in order to hold together plate and mold, as well as the evacuation of air between the plate and mold. There was no discussion of a method or apparatus for evacuating.*

A commonly used method to determine whether or not a spherical surface on glass meets its required accuracy is to make a master glass having the opposite curve. The two pieces are placed one on the other, the combination held under a light source, flat and usually monochromatic, and the reflections at the interface between the master and the work piece are observed. If they are very close to the same curve, the light from one of the surfaces will interface with that from the other and Newtonian rings or interference fringes may be observed. The character of these interference fringes is such that the worker may accurately determine the relative match between the master and the work piece.

The present invention teaches a method for making replica contour block masters for use in producing and checking for accuracy Schmidt correctors.

BRIEF DESCRIPTION OF THE INVENTION

A method for making replica contour block masters for use in producing and checking for accuracy Schmidt correctors wherein a glass spindle master is ground and polished to an accurate flat. An oversize but otherwise finished Schmidt corrector plate to be duplicated which is flat on one side and figured on the other is apertured at the optical center thereof and shallow grooves ground into the corrector on the curve side. The corrector plate is placed flat side to flat spindle master surface and a thin piece of glass to constitute a replica piece is placed on the corrector plate with a vacuum drawn therebetween to conform their surfaces. The replica piece is ground and polished flat on its free upper surface. The corrector plate and replica piece are then removed from the spindle master and the replica piece alone placed flat side to flat surface of the spindle master in optical contact in a semi-permanent bond therewith and constituting together a contour block master.

Additional objects, features and advantages of the present invention will be more readily apparent from the following detailed description of an embodiment the accompanying drawings in which.

Figure 1:
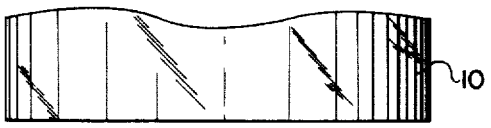
FIG. 1 is a section through a contoured glass master block.

Referring now in detail to the drawings, a known contour block master 10 is shown in FIG. 1 and which consists of glass of good anneal and stability and normally has a larger diameter than a desired Schmidt plate to be produced and is carefully figured on one surface to the inverse curve of a Schmidt plate. Such contour block masters for producing Schmidt corrector plates have heretofore been figured using the classical technique.

The present method is for reproduction of these masters with ease as compared with the classical technique or approach.

Figure 2:
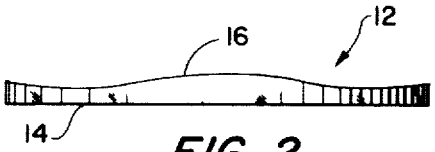
FIG. 2 is a section through a Schmidt corrector plate.
Figure 3:
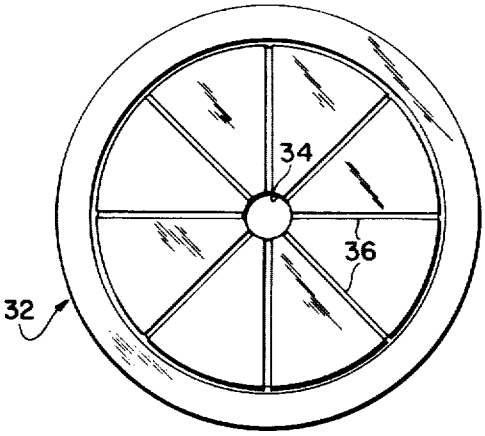
FIG. 3 is a plan view of a Schmidt corrector plate as shown in FIG. 2, which has been apertured and grooved for practicing the invention.

A Schmidt corrector plate 12 is shown in FIG. 2 and as is usual in at least one embodiment or type, the plate includes a flat surface 14 and a contoured surface 16.

Figure 4:
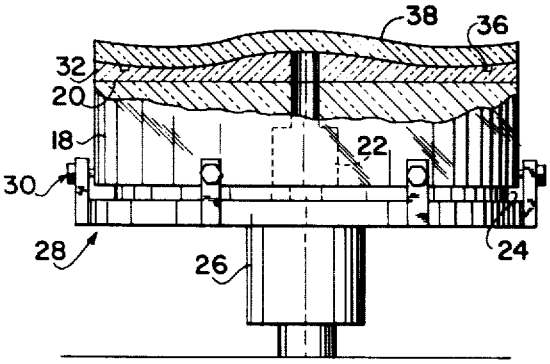
FIG. 4 is a schematic view depicting apparatus and a step in performing the present method.

In forming or making the contour block master in accordance with the present invention, instead of grinding, polishing and figuring onto the contour block surface, the inverse curve of the desired corrector, a base block or spindle master 18, FIG. 4, of appropriate glass material and dimensions is prepared by grinding and polishing its upper surface 20 flat. The spindle master is provided with a through extending bore 22 and mounted on a backing plate generally indicated at 24 which in turn is mounted on the spindle 26 of a grinding and polishing machine generally designated 28 with appropriate orienting and mounting means generally indicated at 30. Means, not shown, are used for rotating the spindle assembly as also means for applying a vacuum through the spindle to the apertured portion 22 which can include a rotating vacuum coupler or the like.

After the spindle master has been so prepared and mounted, an oversize but otherwise finished corrector plate which is flat on one side and figured on the other is prepared by marking the optical center of the corrector which has been accurately determined. This corrector plate 32 has a small hole 34 ground into its center. Shallow grooves are then ground into the corrector on the curve side in a cartwheel pattern as indicated at 36.

After the Schmidt corrector plate has been prepared as above, the flat side is very carefully cleaned. The flat exposed surface of the spindle master is also carefully cleaned. The corrector plate 32 is placed on the spindle master 18 with flat side to flat side. Great care must be exercised here to make sure that the exact optical center of the corrector is placed over the center of rotation of the spindle master. Also the corrector and spindle master must be indexed so that it may later be returned to the exact same position and orientation. This is also necessary in order that the replica master to be produced can be replaced on the spindle master in the same orientation.

A replica piece 38 is then prepared. This consists of a thin piece of glass having the same diameter as the spindle master which is ground and polished flat on one side using conventional means. The flat side is carefully cleaned as is the top, grooved side of the corrector to be replicated, which has previously been placed in optical contact with the spindle master as shown in FIG. 4. The replica piece 38 is now placed on the corrector 32 as shown and vacuum applied in the system and through the bore 22. The curve of the corrector is now duplicated on the top side of the replica piece due to conformation of the thin glass replica piece to the contoured surface of the corrector plate. The replica piece is now ground and polished flat in the three layer sandwiched position as shown in FIG. 4.

Usual and known methods can be utilized for checking the accuracy of the flat surface as so ground and polished. After this step, the replica piece 38 and corrector plate 32 are removed from the spindle master 18. A hole 40 is cored into the center of the replica piece and the replica piece alone is contacted, flat side down, to the spindle master 18 in the exact orientation as when it was ground and polished. Replacing the replica piece in the exact orientation as it was ground on the spindle master automatically eliminates any irregularities that might be present on the spindle master. The top surface of the replica piece can now, for some uses, be grooved as at 42 utilizing the same cartwheel pattern as shown at 36 in FIG. 2. As an intermediate step, if desired, the accuracy of the replica and spindle master combination can be checked by utilizing a test piece and noting resultant interference fringes at the interface of the pieces in a known manner.

Figure 5:
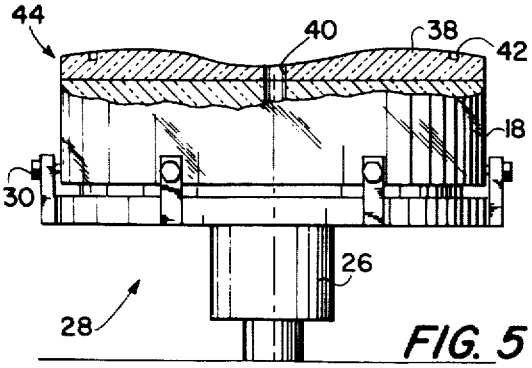
FIG. 5 is a schematic view, partly in section, of a finalized replica contour block master in accordance with the invention.

The replica piece as placed on the flat spindle master together therewith constitute a contour block master or replica master generally designated 44 as shown in FIG. 5. The replica piece remains in a semi-permanent bond with the spindle master when so placed. It is held in place by optical contact only. This combination of replica piece and spindle master serve the same function as a one piece contour block as shown in FIG. 1.

While a single embodiment of the invention has been hereinabove described, manifestly minor changes can be effected without departing from the spirit and scope thereof as defined in and limited solely by the appended claims.

We claim:

1. A method for making replica contour block masters for use in producing Schmidt correctors comprising:

A. mounting a corrector plate to be duplicated, having a flat side and a contoured side, on a flat surfaced spindle master in flat side to flat surfaced contact;

B. mounting a flat surfaced piece of glass to constitute a replica piece on the corrector plate;

C. introducing a vacuum between said corrector plate and said replica piece to conform mating surfaces thereof;

D. grinding and polishing the upper free surface of said replica piece flat;

E. releasing the vacuum; and

F. removing said corrector plate and replica piece from said spindle master, the replica piece being corresponded in contour on one side to said corrector plate, and constituting a component for use as a contour block master.

2. A method as claimed in claim 1, wherein said replica piece is contoured on one side and flat on the other side thereof, and mounting said replica piece with the flat side thereof juxtaposed to the flat surface of said spindle master in a semi-permanent bond therewith and consituting together a finalized contour block master.

3. A method as claimed in claim 2, including accurately determining and marking the optical center of said corrector plate, grinding a small hole into said center and grooving said corrector plate on the contoured side thereof in a cartwheel pattern, said vacuum being introduced through said hole and thereby into said grooves to facilitate conforming mating surfaces of said corrector plate and said replica piece.

4. A method as claimed in claim 3, wherein the exact optical center of said corrector plate is placed over the center of rotation of said spindle master and said corrector plate and spindle master are indexed for subsequent return, after removal, to the exact same position and orientation and so that said replica piece can be mounted on said spindle master to constitute said contour block master in the same orientation.

5. A method as claimed in claim 4, wherein, subsequent to removal of said corrector plate and replica piece from said spindle master, said replica piece is cored in the center prior to mounting flat side to flat surface on said spindle master in the exact orientation as when said replica piece is ground and polished and said replica piece is replaced in the exact orientation as when ground on said spindle master to eliminate any irregularities present on said spindle master.

6. A method as claimed in claim 5, wherein, subsequent to mounting of said replica piece on said spindle master, the top contoured surface of said replica piece is grooved in a cartwheel pattern.

7. A method as claimed in claim 6, wherein said replica piece is in a semi-permanent bond with said spindle master and held in place by optical contact only.

*8. In a contour block master for use in producing Schmidt correctors the combination of:*

*A. a thick master which is flat on one side, and*

*B. a thin piece which is flat on one side and having its other side ground and polished to the inverse curve of the desired Schmidt corrector, said thin piece being mounted on the thick contour block master flat side to flat side in a semi-permanent bond, the combination serving the same purpose as a solid contour block master.*

*9. In a contour block master for use in producing Schmidt correctors the combination of claim 8, wherein said thin piece has a small hole ground into its center with shallow grooves on the curve side extending in a cartwheel pattern from said small hole.*

*10. The product of a replica piece by the process of claim 1.*

*11. The product of a two-piece contour block master by the process of claim 2.*

*12. The product of a two-piece contour block master by the process of claim 3.*

*13. The product of a two-piece contour block master by the process of claim 4.*

*14. The product of a two-piece contour block master by the process of claim 5.*

*15. The product of a two-piece contour block master by the process of claim 6.*

*16. The product of a two-piece contour block master by the process of claim 7.*

*17. A method for making replica contour block masters for use in producing Schmidt correctors comprising:*

*A. mounting a corrector plate to be duplicated having a flat side and a contoured side on a vacuum device;*

*B. mounting a flat surface piece of glass to constitute a replica piece on the corrector plate on a contoured side thereof;*

*C. introducing a vacuum between said corrector plate and said replica piece to conform the mating surfaces thereof;*

*D. grinding and polishing the upper free surface of said replica piece flat;*

*E. releasing the vacuum; and*

*F. separating said corrector plate and replica piece, the replica piece being corresponded in contour on one side to said corrector plate, and constituting a component for use as a contour block master.*

* * * * *